US 9,083,929 B2

(12) United States Patent
Kitajima

(10) Patent No.: US 9,083,929 B2
(45) Date of Patent: *Jul. 14, 2015

(54) IMAGE-PICKUP APPARATUS AND WHITE-BALANCE CONTROL METHOD PROVIDED THEREFOR

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,407

(22) Filed: Sep. 14, 2012

(65) Prior Publication Data

US 2013/0010157 A1 Jan. 10, 2013

Related U.S. Application Data

(63) Continuation of application No. 12/404,789, filed on Mar. 16, 2009, now Pat. No. 8,294,783.

(30) Foreign Application Priority Data

Mar. 17, 2008 (JP) ................................. 2008-067873

(51) Int. Cl.
H04N 9/73 (2006.01)
(52) U.S. Cl.
CPC ..................... *H04N 9/735* (2013.01)
(58) Field of Classification Search
CPC .............................. H04N 9/735; H04N 9/73
USPC .................... 348/223.1; 382/167; 358/516
See application file for complete search history.

(56) References Cited

U.S. PATENT DOCUMENTS

| 6,906,744 | B1 * | 6/2005 | Hoshuyama et al. ...... 348/223.1 |
| 7,013,042 | B1 * | 3/2006 | Yamada et al. ............... 382/167 |
| 8,294,783 | B2 * | 10/2012 | Kitajima .................... 348/223.1 |
| 2002/0037101 | A1 * | 3/2002 | Aihara .......................... 382/167 |
| 2003/0058350 | A1 * | 3/2003 | Ishimaru et al. ........... 348/223.1 |
| 2005/0089220 | A1 * | 4/2005 | Park et al. ..................... 382/167 |
| 2005/0219587 | A1 * | 10/2005 | Hayaishi ........................ 358/1.9 |
| 2006/0284991 | A1 * | 12/2006 | Ikeda .......................... 348/223.1 |
| 2009/0021602 | A1 * | 1/2009 | Fujiwara et al. ........... 348/223.1 |
| 2009/0167892 | A1 * | 7/2009 | Takayama .................. 348/223.1 |

FOREIGN PATENT DOCUMENTS

| JP | 2001136539 A | 5/2001 |
| JP | 2005086641 A | 3/2005 |
| JP | 2006042152 A | 2/2006 |
| JP | 2008017259 A | 1/2008 |

* cited by examiner

*Primary Examiner* — Paul Berardesca
(74) *Attorney, Agent, or Firm* — Canon U.S.A., Inc. IP Division

(57) ABSTRACT

The present invention allows for selecting a predetermined chromatic color for extraction from among a plurality of chromatic colors based on the result of identification of acquired photographing information. When the value of a white extraction area of the photographing information is smaller than a first threshold value, it is determined whether the value of the area of the selected predetermined chromatic color is greater than or equal to a second threshold value. If the value of the predetermined chromatic-color area is determined to be greater than or equal to the second threshold value, white balance is controlled by bringing the value of the predetermined chromatic-color area near to a predetermined target color value.

5 Claims, 15 Drawing Sheets

FACE

BLUE SKY

TREES AND PLANTS

FIG. 9

| PHOTOGRAPHING MODE | CHROMATIC COLOR FOR EXTRACTION |
|---|---|
| PORTRAIT | FLESH |
| FRESH GREEN | GREEN |
| BLUE SKY | BLUE |
| SUNSET | RED |
| OTHERS | NOT TO BE EXTRACTED |

.# IMAGE-PICKUP APPARATUS AND WHITE-BALANCE CONTROL METHOD PROVIDED THEREFOR

CROSS-REFERENCE TO RELATED APPLICATIONS

This application is a continuation of U.S. patent application Ser. No. 12/404,789 filed Mar. 16, 2009 now U.S. Pat. No. 8,294,783, which claims priority to Japanese Patent Application No. 2008-067873 filed on Mar. 17, 2008. Each of U.S. patent application Ser. No. 12/404,789 and Japanese Patent Application No. 2008-067873 is hereby incorporated by reference herein in its entirety.

BACKGROUND OF THE INVENTION

1. Field of the Invention

The present invention relates to an image-pickup apparatus featuring an auto-white-balance-control technology and a white-balance control method provided therefor.

2. Description of the Related Art

In recent years, systems configured to automatically control white balance by using the output of an image-pickup element without using an external sensor have become the mainstream of auto-white-balance control systems used for a video camera. Japanese Patent Laid-Open No. 05-64219 has proposed a white-balance control device having the above-described configuration.

The white-balance control device that has been proposed by Japanese Patent Laid-Open No. 05-64219 obtains color-difference signals (R-Y and B-Y) and a luminance signal (Y) from color signals of red (R), green (G), and blue (B), and extracts the color-signal component corresponding to a color close to white from the luminance signal and the color signals. Further, the white-balance control device performs control so that the average of the extracted color signals becomes equal to the value of a white color (an achromatic color) determined to be the target.

Further, technologies for estimating the color temperature of the light source by using a chromatic color such as a flesh color in the case where the signal components corresponding to the color close to white are few in number in relation to the entire screen image have been available (e.g., refer to Japanese Patent Laid-Open No. 2003-333616).

Conventional technologies will be described next in detail with reference to FIG. 13.

FIG. 13 is a block diagram showing an exemplary image-pickup apparatus having a conventional white-balance control device.

In FIG. 13, an imaging system 1301 includes a lens configured to form a light flux of the subject into an image and an image-pickup element configured to perform photoelectric conversion for incident light. A luminance-and-color-signal generation unit 1302 converts a signal generated by the imaging system 1301 into a luminance signal (Y) and color signals (R, G, and B).

A luminance processing unit 1303 performs unsharp masking and/or gamma processing for the luminance signal. A white-balance amplification unit 1304 amplifies the color signals (R, G, and B) transmitted from the luminance-and-color-signal generation unit 1302 based on a white balance gain.

A color processing unit 1305 performs generation of color-difference signals (R-Y and B-Y), color-balance adjustment, and so forth. An output unit 1306 outputs an image signal. A white extraction unit 1307 extracts the signal corresponding to a color close to white from the image signal.

A chromatic-color extraction unit 1308 extracts the signal corresponding to a color close to a predetermined chromatic color from the image signal. A white-balance gain control unit 1309 determines the white balance gain of the white-balance amplification unit 1304 based on the result of the extraction performed by each of the white extraction unit 1307 and the chromatic-color extraction unit 1308.

Next, operations of the above-described system will be described.

The imaging system 1301 performs photoelectric conversion for light which is made incident through an optical system by using the image-pickup element and transmits the image signal to the luminance-and-color-signal generation unit 1302. The luminance-and-color-signal generation unit 1302 generates the luminance signal (Y) and the color signals (R, G, and B) based on the transmitted image signal, and transmits the luminance signal to the luminance processing unit 1303 and transmits the color signals to the white-balance amplification unit 1304.

The luminance processing unit 1303 performs the unsharp masking, the gamma processing, and so forth for the luminance signal. On the other hand, the white-balance amplification unit 1304 amplifies the color signals (R, G, and B) based on the white balance gain transmitted from the white-balance gain control unit 1309 which will be described later and transmits the amplified color signal to the color processing unit 1305.

The color processing unit 1305 generates the color-difference signals (R-Y and B-Y) based on the color signals (R, G, and B), performs color processing such as color-balance adjustment for the color-difference signals, and transmits the color-difference signals to the output unit 1306, the white extraction unit 1307, and the chromatic-color extraction unit 1308. The output unit 1306 externally transmits the luminance signal and the color-difference signals.

The white extraction unit 1307 extracts the signal corresponding to a color close to a white color based on the luminance signal (Y) and the color-difference signals (R-Y and B-Y).

FIG. 14A shows a white extraction range 1401 of which data is extracted as a white-color area. FIG. 14A shows a color-difference (R-Y and B-Y) plane and the white extraction range 1401 is the range of a color close to white (achromatic color).

The white extraction unit 1307 extracts a signal that is included in a predetermined luminance range and that is included in the white extraction range 1401. Further, the white extraction unit 1307 calculates the average of the extracted color signals (extracted-white-color average) and the amount of white-color signals obtained through white extraction (white-color amount), and transmits information about the extracted-white-color average and the white-color amount to the white-balance gain control unit 1309.

The chromatic-color extraction unit 1308 extracts the signal corresponding to a color close to a flesh color from the luminance signal (Y) and the color-difference signals (R-Y and B-Y).

FIG. 14B shows a flesh-color extraction range 1402 of which data is extracted as a flesh-color area.

The chromatic-color extraction unit 1308 extracts a signal that is included in a predetermined luminance range and that is included in a flesh-color extraction range 1402. Further, the flesh-color extraction unit 1308 calculates the average of the extracted color signals (extracted-flesh-color average) and the amount of extracted flesh-color signals (flesh-color amount), and transmits information about the extracted-flesh-color average and the flesh-color amount to the white-balance gain control unit 1309.

The white-balance gain control unit 1309 controls the white balance gain based on the result of the color-signal extraction performed by each of the white extraction unit 1307 and the chromatic-color extraction unit 1308.

FIG. 15 is a flowchart showing processing procedures performed by the white-balance gain control unit 1309 shown in FIG. 13 so as to calculate the white balance gain.

According to FIG. 15, it is determined whether the value of the white-color amount is greater than or equal to a predetermined threshold value at step S1501. That is to say, it is determined whether a white area large enough to control the white balance is included in an image. If the value of the white-color amount is greater than or equal to the threshold value, the processing advances to step S1503. If the value of the white-color amount is smaller than the threshold value, the processing advances to step S1502.

At step S1502, it is determined whether the white-balance control is performed based on the flesh-color signal when the image includes a small white-color amount. More specifically, it is determined whether the image includes a flesh-color amount large enough to control the white balance. If the value of the flesh-color amount is greater than or equal to a predetermined threshold value, the processing advances to step S1504. If the value of the flesh-color amount is smaller than the threshold value, the processing advances to step S1505.

At step S1503, the white balance gain is calculated based on the extracted-white-color average. More specifically, a white balance gain which brings the extracted-white-color average near to the target white (the origin point of the color-difference plane) is calculated.

FIG. 16A shows details of the white-balance-gain control attained based on the extracted-white-color average. FIG. 16A shows an extracted-white-color average 1601 and a point 1602, which is the origin point of the color-difference plane.

The white-balance gain control unit 1309 determines the white balance gain of a red (R) signal and a blue (B) signal so that the extracted-white-color average 1601 is brought near to the origin point (achromatic color) 1602 of the color-difference plane, and transmits information about the gain to the white-balance amplification unit 1304.

According to FIG. 16A, the white balance gain is determined so that the position of the extracted-white-color average 1601, which is shown in FIG. 16A, is brought near to the origin point 1602. Consequently, the gain of the red (R) signal is decreased and that of the blue (B) signal is increased.

At step S1504, the white balance gain is calculated based on the extracted-flesh-color average. More specifically, a white balance gain which brings the extracted-flesh-color average near to the target flesh-color value is calculated.

FIG. 16B shows details of the white-balance-gain control attained based on the extracted-flesh-color average. FIG. 16B shows an extracted-flesh-color average 1603 and a target flesh-color value 1604.

The white-balance gain control unit 1309 determines the white balance gain of a red (R) signal and a blue (B) signal so that the extracted-flesh-color average 1603 is brought near to a predetermined target flesh-color value, that is, the target flesh-color value 1604, and transmits information about the gain to the white-balance amplification unit 1304.

According to FIG. 16B, the white balance gain is determined so that the extracted-flesh-color average 1603, which is shown in FIG. 16B, is brought near to the target flesh-color value 1604. Consequently, the gain of the red (R) signal is decreased and that of the blue (B) signal is increased.

At step S1505, the currently used white balance gain is used, as it is, without calculating another white balance gain. The above-described processing is performed when the white-color area and the flesh-color area that are included in the image are too small to make a determination.

The white-balance amplification unit 1304 amplifies the color signals based on another white balance gain set for the photographed images corresponding to the next frame or later through the white-balance control unit 1309.

The above-described configuration allows for attaining the white-balance control through the use of information about a flesh color even though an image includes a small number of white-color signals, which makes it difficult to attain the white-balance control.

According to the above-described conventional technologies, information about a flesh color has been used when an image (screen image) includes a little amount of information about a color close to the white color. However, the image does not necessarily include information about the white color and/or the flesh-color information at all times. Further, if a subject image includes neither the information about the color close to the white color nor the flesh-color information, it becomes difficult to adjust the white balance.

SUMMARY OF THE INVENTION

Accordingly, the present invention provides an image-pickup apparatus that can extract a predetermined color suitable for a subject and perform the white-balance control even though an image includes a small amount of white-color information and a white-balance-control method provided for the image-pickup apparatus.

An image-pickup apparatus according to an aspect of the present invention includes an identification unit configured to identify acquired photographing information, a chromatic-color selection unit configured to select a predetermined chromatic color for extraction from among a plurality of chromatic colors based on a result of the identification performed by the identification unit, the first determining unit configured to determine whether the value of a white extraction area of the photographing information is greater than or equal to a first threshold value, the first white-balance control unit configured to control white balance by bringing the color of the white extraction area near to an achromatic color when the first determining unit determines that the value of the white-extraction area is greater than or equal to the first threshold value, the second determining unit configured to determine whether the value of the area of the selected predetermined chromatic color is greater than or equal to a second threshold value when the first determining unit determines that the value of the white extraction area is smaller than the first threshold value, and the second white-balance control unit configured to control the white balance by bringing the value of the predetermined chromatic-color area near to a predetermined target color value when the second determining unit determines that the value of the predetermined chromatic-color area is greater than or equal to the second threshold value.

According to another aspect of the present invention, a white-balance control method used for an image-pickup apparatus is provided, where the method includes an identification step provided to identify acquired photographing information, a chromatic-color selection step provided to select a predetermined chromatic color for extraction from among a plurality of chromatic colors based on the result of the identification performed through the identification step, the first determining step provided to determine whether the value of a white extraction area of the photographing information is greater than or equal to a first threshold value, the first white-balance control step provided to control white balance by bringing the color of the white extraction area near to an achromatic color when it is determined that the value of the white-extraction area is greater than or equal to the first threshold value through the first determining step, the second determining step provided to determine whether the value of the area of the selected predetermined chromatic color is greater than or equal to a second threshold value when it is determined that the value of the white extraction area is smaller than the first threshold value through the first determining step, and the second white-balance control step provided to control the white balance by bringing the value of the predetermined-chromatic-color area near to a predetermined target color value when it is determined that the value of the predetermined-chromatic-color area is greater than or equal to the second threshold value through the second determining step.

An image-pickup apparatus according to another aspect of the present invention includes a white extraction unit configured to extract a signal included in a predetermined white extraction range from acquired photographing information, the first white-balance control unit configured to control white balance by bringing a color extracted by the white extraction unit near to an achromatic color, a chromatic-color extraction unit configured to extract a signal included in the range of a predetermined chromatic color from the photographing information, the second white-balance control unit configured to control the white balance by bringing the value of a predetermined chromatic color extracted by the chromatic-color extraction unit near to a predetermined target color value, and a chromatic-color selection unit configured to select the predetermined chromatic color for extraction from among a plurality of chromatic colors based on the acquired photographing information.

According to another aspect of the present invention, a white-balance control method used for an image-pickup apparatus is provided, where the method includes a white extraction step provided to extract a signal included in a predetermined white extraction range from acquired photographing information, the first white-balance control step provided to control white balance by bringing a color extracted through the white extraction step near to an achromatic color, a chromatic-color extraction step provided to extract a signal included in the range of a predetermined chromatic color from the photographing information, the second white-balance control step provided to control the white balance by bringing the value of a predetermined chromatic color extracted through the chromatic-color extraction step near to a predetermined target color value, and a chromatic-color selection step provided to select the predetermined chromatic color for extraction from among a plurality of chromatic colors based on the acquired photographing information.

An image-pickup apparatus according to another aspect of the present invention includes a white extraction unit configured to extract a signal included in a predetermined white extraction range from acquired photographing information, the first estimation unit configured to estimate the first color temperature based on a color signal extracted by the white extraction unit, a chromatic-color extraction unit configured to extract a signal included in the range of a predetermined chromatic color from the photographing information, the second estimation unit configured to estimate the second color temperature based on the color signal of a chromatic color extracted by the chromatic-color extraction unit, a calculation unit configured to calculate the parameter of white balance based on the first and second estimated color temperatures, and a chromatic-color selection unit configured to select the predetermined chromatic color for extraction from among a plurality of chromatic colors based on the acquired photographing information.

According to another aspect of the present invention, a white-balance control method used for an image-pickup apparatus is provided, where the white-balance control method includes a white extraction step provided to extract a signal included in a predetermined white extraction range from acquired photographing information, the first estimation step provided to estimate the first color temperature based on a color signal extracted through the white extraction step, a chromatic-color extraction step provided to extract a signal included in the range of a predetermined chromatic color from the photographing information, the second estimation step provided to estimate the second color temperature based on a color signal of a chromatic color extracted through the chromatic-color extraction step, a calculation step provided to calculate the parameter of white balance based on the first and second estimated color temperatures, and a chromatic-color selection step provided to select the predetermined chromatic color for extraction from among a plurality of chromatic colors based on the acquired photographing information.

Further features of the present invention will become apparent from the following description of exemplary embodiments with reference to the attached drawings.

BRIEF DESCRIPTION OF THE DRAWINGS

FIG. 9 shows the relationships between photographing modes and chromatic colors for extraction that are used by the image-pickup apparatus shown in FIG. 8.

DESCRIPTION OF THE EMBODIMENTS

Various embodiments of the present invention will now be described in detail in accordance with the accompanying drawings.

An example where a predetermined color used when an image shows few colors close to white is selected based on information about the identification of a subject will be described, as a first embodiment of the present invention.

Figure 1:
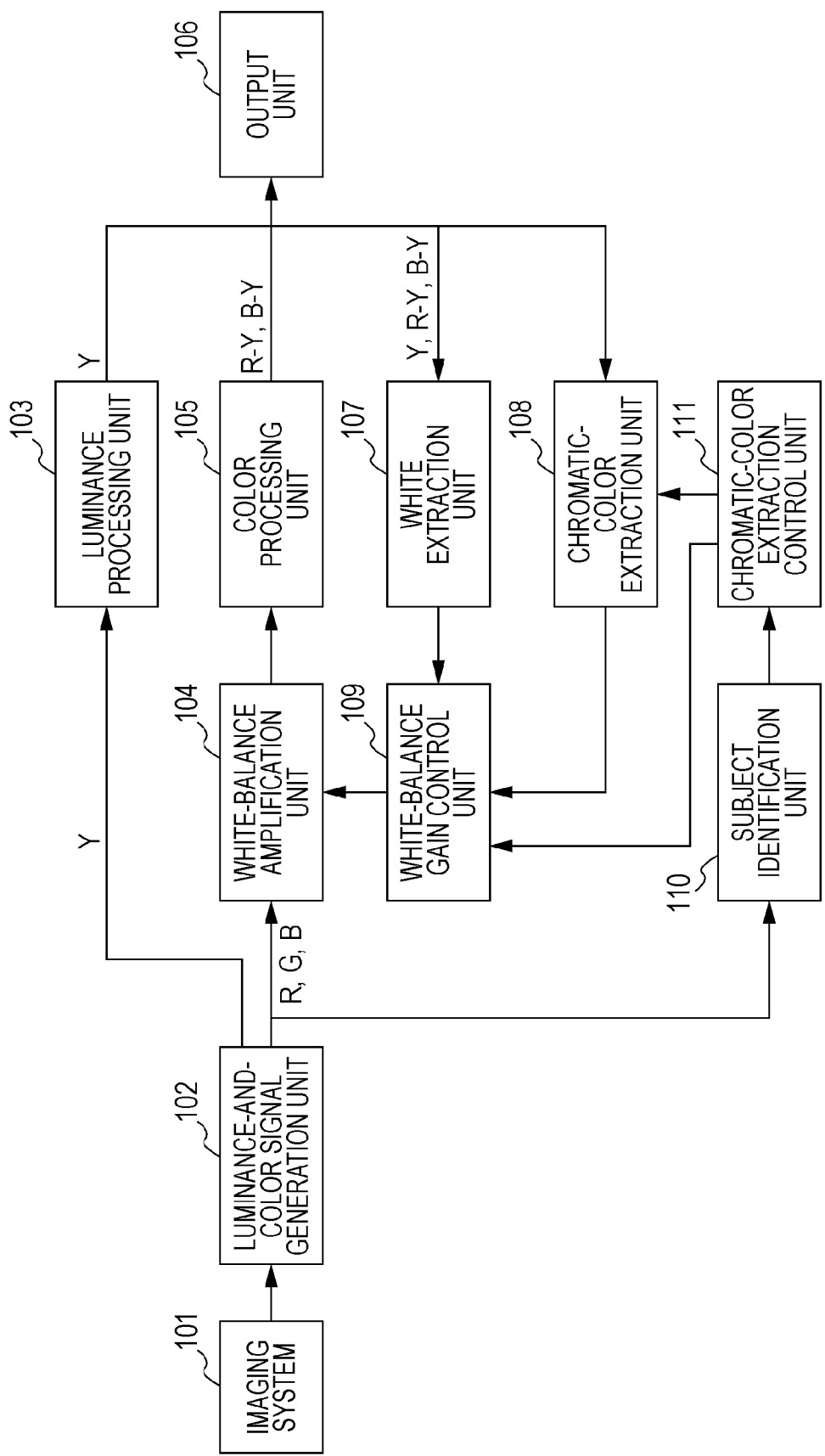
FIG. 1 is a block diagram of an image-pickup apparatus according to a first embodiment of the present invention.

FIG. 1 is a block diagram of an image-pickup apparatus according to the first embodiment.

In FIG. 1, an imaging system 101 includes a lens configured to form a light flux of the subject into an image and an image-pickup element. A luminance-and-color-signal generation unit 102 converts a signal generated through the imaging system 101 into a luminance signal (Y) and color signals (R, G, and B).

A luminance processing unit 103 performs unsharp masking and/or gamma processing for the luminance signal. A white-balance amplification unit 104 amplifies the color signals (R, G, and B) transmitted from the luminance-and-color-signal generation unit 102 based on a white balance gain.

A color-processing unit 105 performs generation of color-difference signals (R-Y and B-Y), color-balance adjustment, and so forth. An output unit 106 outputs image signals. A white extraction unit 107 extracts the signal corresponding to a color close to white from the image signals.

A chromatic-color extraction unit 108 extracts the signal corresponding to a color close to a predetermined chromatic color from the image signals. A white-balance gain control unit 109 determines the white balance gain of the white-balance amplification unit 104 based on the result of the extraction performed by each of the white extraction unit 107 and the chromatic-color extraction unit 108.

A subject identification unit 110 identifies a photographed image of the subject. A chromatic-color-extraction control unit 111 controls the chromatic-color extraction based on the identification result.

Next, operations of a system having the above-described configuration will be described.

Figure 13:
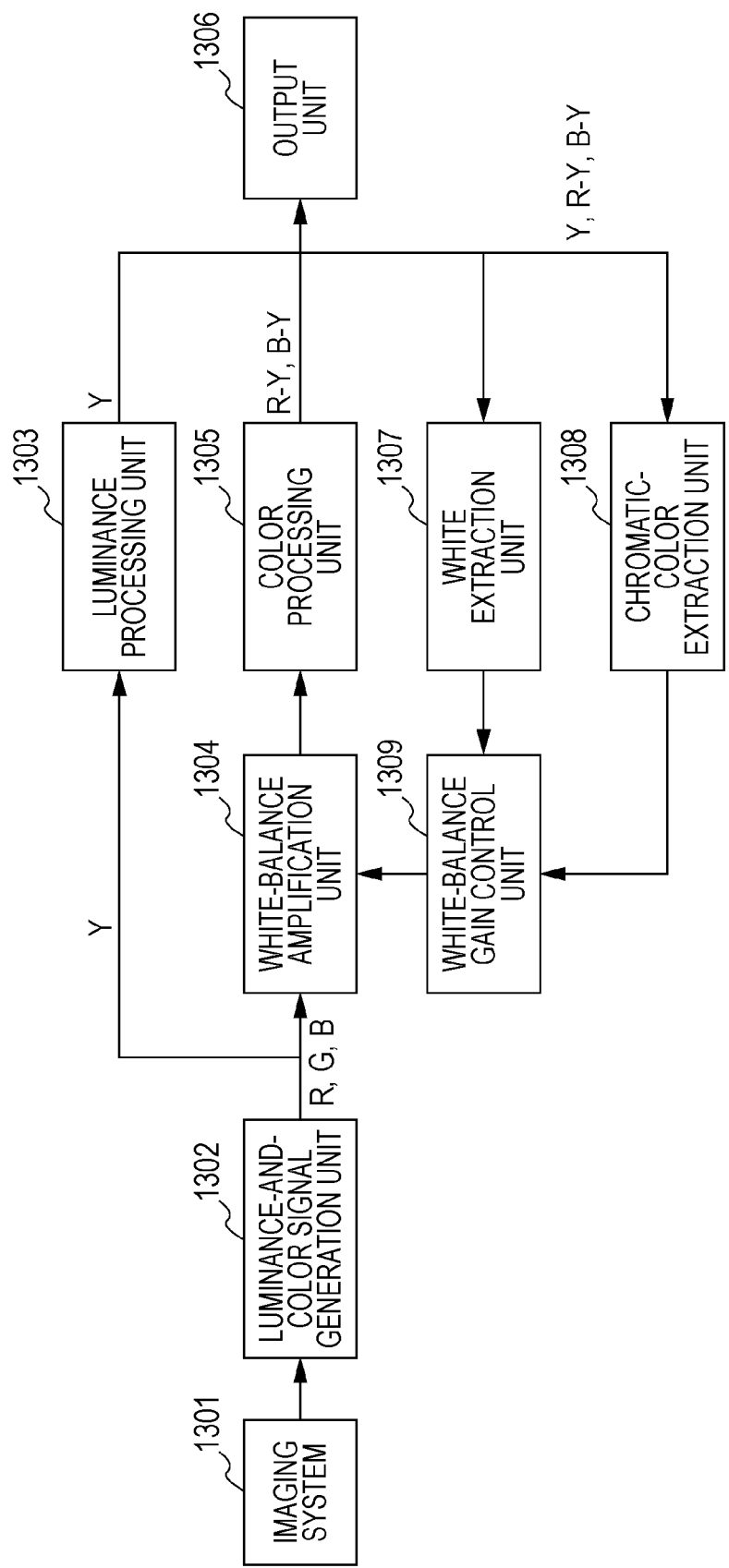
FIG. 13 is a block diagram showing the configuration of an exemplary conventional image-pickup apparatus.

The processing procedures performed to extract the signal corresponding to the color close to white, which are started by the image-pickup system 101 and completed by the white extraction unit 107, are the same as those started by the image-pickup system 1301 and completed by the white extraction unit 1307, as illustrated in an exemplary related art shown in FIG. 13, and therefore redundant description thereof is omitted.

Next, the subject identification unit 110 will be described. The subject identification unit 110 identifies what the picked-up subject image is. According to the first embodiment, the subject identification unit 110 identifies whether the photographed image includes images of "person's face", "blue sky", and "green trees and plants".

Figure 2A:
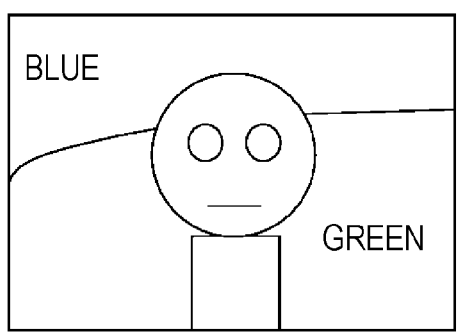
FIG. 2A shows an exemplary photographed image obtained through the image-pickup apparatus shown in FIG. 1.
Figure 2B:
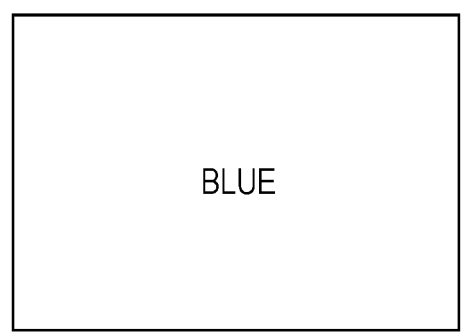
FIG. 2B shows another exemplary photographed image obtained through the image-pickup apparatus shown in FIG. 1.
Figure 2C:
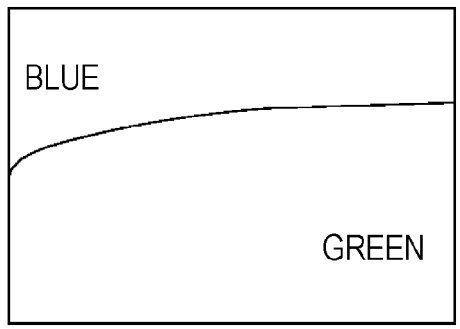
FIG. 2C shows another exemplary photographed image obtained through the image-pickup apparatus shown in FIG. 1.

Each of FIGS. 2A, 2B, and 2C shows an exemplary subject. FIG. 2A shows an image including the image of a person's face, FIG. 2B shows an image including the image of the blue sky, and FIG. 2C shows an image including the image of green trees and plants.

Various methods have been proposed to achieve a unit configured to identify subjects including a person's face or the like, and any of the above-described methods may be used for the subject identification unit. To identify the "person's face", for example, data of the edge of the face is extracted based on a luminance signal Y of a photographed image, and the extracted edge data is matched with data of the pattern of a part of the face, where the face data had already been stored, so that the face is identified. Data of the result of the subject identification is transmitted to the chromatic-color extraction control unit 111.

The chromatic-color-extraction control unit 111 selects a single chromatic color which should be extracted by the chromatic-color-extraction control unit 111, so as to control the white balance.

Figure 3:
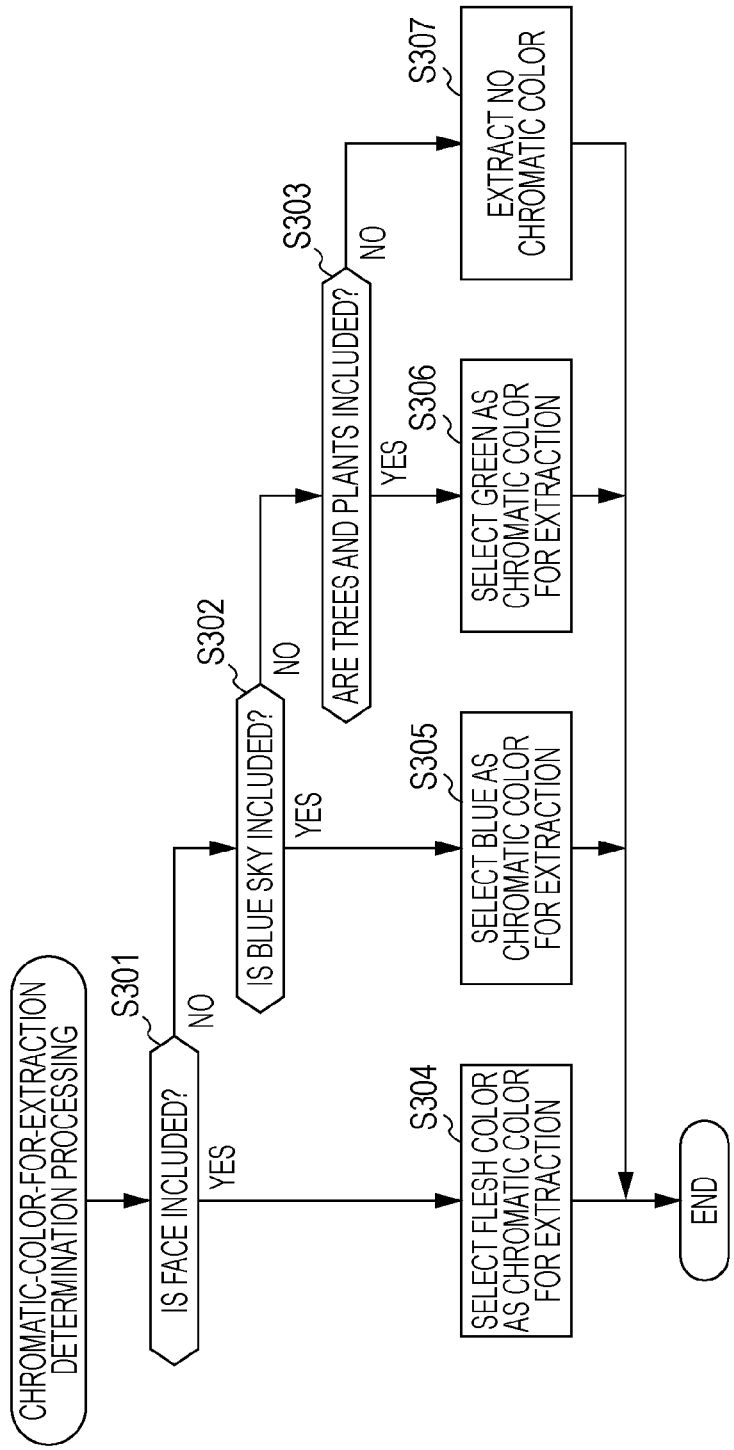
FIG. 3 is a flowchart illustrating chromatic-color-for-extraction determining processing procedures performed by a chromatic-color-extraction control unit shown in FIG. 1.

FIG. 3 is a flowchart illustrating chromatic-color-for-extraction determining processing procedures performed by the chromatic-color-extraction control unit 111 shown in FIG. 1.

The chromatic-color-extraction control unit 111 determines the chromatic color for extraction based on the subject-identification-result data transmitted from the subject identification unit 110.

According to FIG. 3, it is determined whether the photographed image includes the image of the person's face at step S301. If the photographed image includes the face image, the processing advances to step S304. Otherwise, the processing advances to step S302.

At step S302, it is determined whether the photographed image includes the image of the blue sky. If the photographed image includes the blue-sky image, the processing advances to step S305. Otherwise, the processing advances to step S303.

At step S303, it is determined whether the photographed image includes the image of the green trees and plants. If the photographed image includes the image of the green trees and plants, the processing advances to step S306. Otherwise, the processing advances to step S307.

Steps S301 to S303 function, as an identification unit (subject identification unit) configured to identify what the acquired photographing information (subject) is.

At step S304, a flesh color is selected as the chromatic color for extraction. At step S305, a blue color is selected as the chromatic color for extraction. At step S306, a green color is selected as the chromatic color for extraction. At step S307, it is determined that no chromatic color is extracted. Then, the processing procedures are finished.

Steps S304 to S306 function, as a chromatic-color selection unit configured to select a predetermined chromatic color for extraction from among a plurality of chromatic colors based on the result of the identification performed by the identification unit.

The subject information and information about the chromatic color for extraction that are determined based on the above-described flow are transmitted to the chromatic-color extraction unit 108 and the white-balance gain control unit 109.

The chromatic-color extraction unit 108 extracts a chromatic color based on the subject-identification information and the chromatic-color-for-extraction information. When the flesh color is exemplarily selected as the chromatic color for extraction, data of a color that falls within the range of the flesh color is extracted from an area defined in the image, the area including the face image, based on the subject-identification information.

Figure 4:
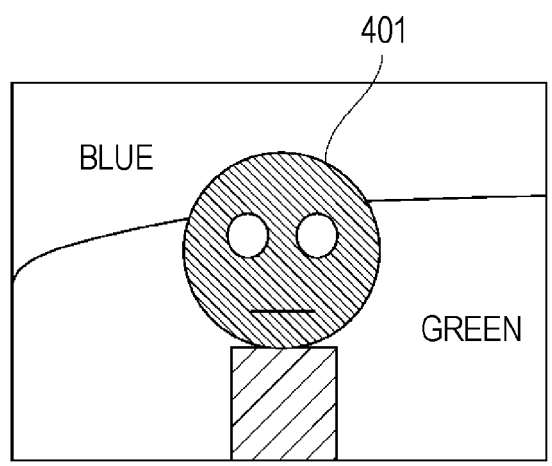
FIG. 4 shows the flesh-color area of a subject image obtained through the image-pickup apparatus shown in FIG. 1.

FIG. 4 shows an example where data of the flesh color is extracted. FIG. 4 shows a photographed image of a subject including a person's face. In FIG. 4, a diagonally shaded area identified as the person's face is a face area 401. The chromatic-color extraction unit 108 extracts data of a color included in a flesh-color extraction range shown in FIG. 12B from the face area 401.

Further, the chromatic-color extraction unit 108 calculates the average of the values of extracted flesh color and the amount of extracted flesh-color signals (flesh-color amount), and transmits information about the average of the extracted flesh-color values and the flesh-color amount to the white-balance gain control unit 109.

According to the above-described embodiment, the chromatic-color-extraction control unit 111 exemplarily selects the flesh color, as the chromatic color for extraction. However, if the blue color is selected as the chromatic color for extraction, a color signal included in a blue-color extraction range is extracted from an area identified as the blue sky. Further, if the green color is selected as the chromatic color for extraction, a green signal is extracted from an area identified as trees and plants.

Figure 5:
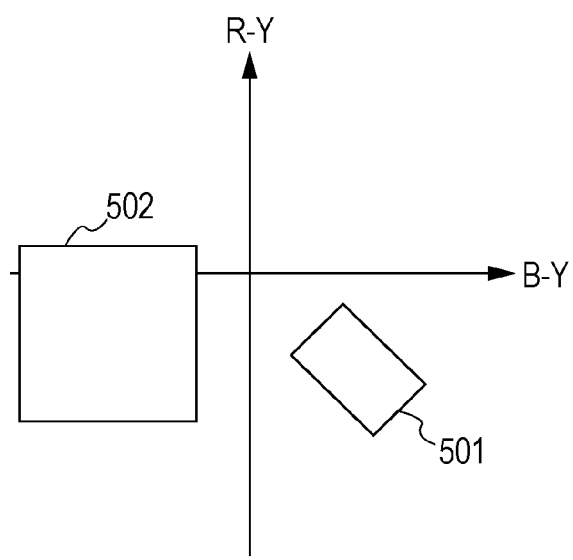
FIG. 5 shows chromatic-color extraction ranges defined by the image-pickup apparatus shown in FIG. 1.

FIG. 5 shows a blue-color-extraction range 501 and a green-color-extraction range 502 that are exemplarily defined on a color-difference plane. In FIG. 5, data of the average of the values of extracted color signals and the extraction amount (the blue-color amount and/or the green-color amount) is transmitted to the white-balance gain control unit 109, as is the case where the flesh color is selected as the chromatic color for extraction.

Next, operations of the white-balance gain control unit 109 will be described. The white-balance gain control unit 109 controls the white balance gain based on the result of the color-signal extraction performed by each of the white-extraction unit 107 and the chromatic-color extraction unit 108.

Figure 6:
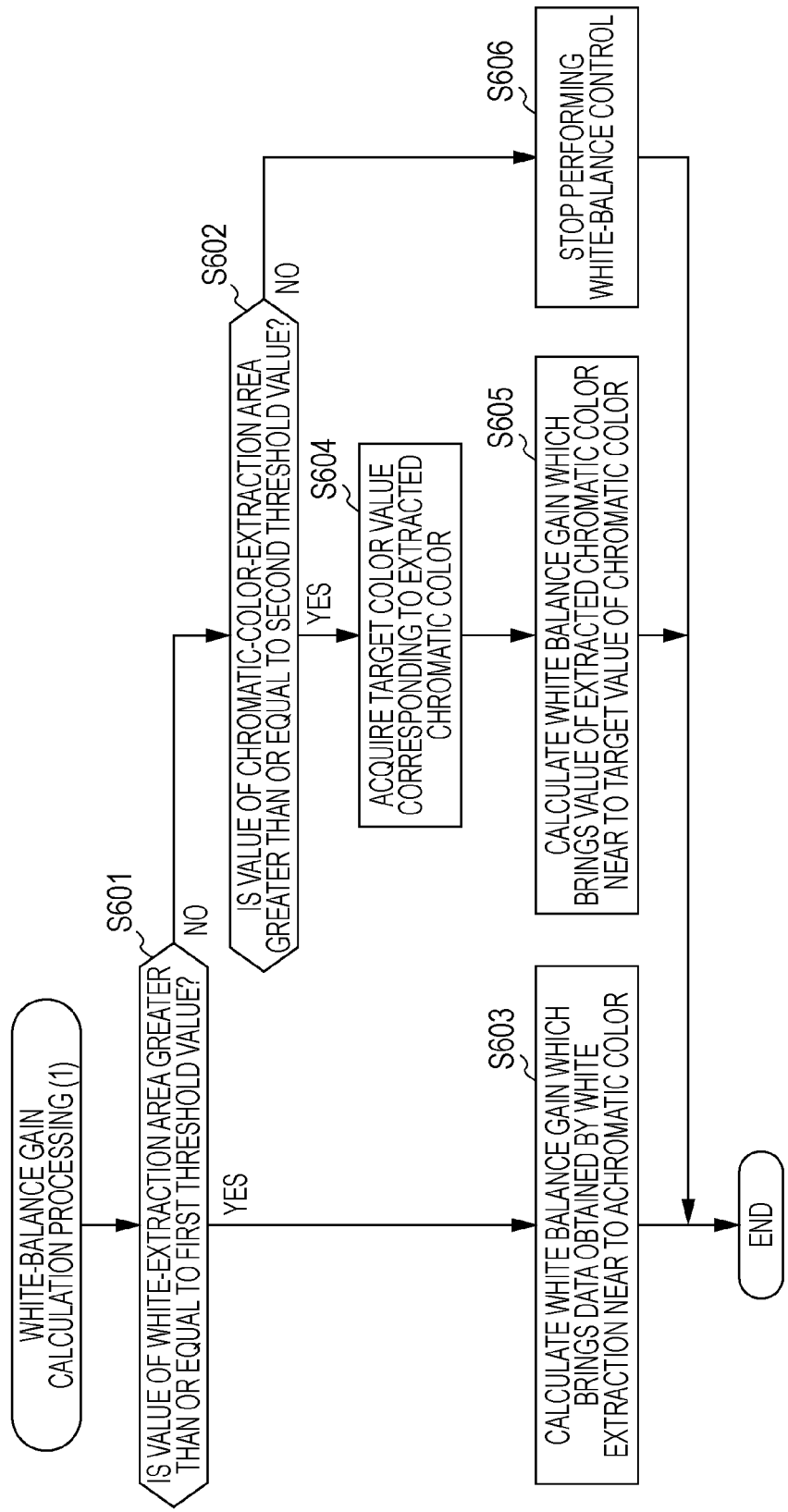
FIG. 6 is a flowchart showing white-balance gain calculation (control) processing procedures executed by a white-balance gain control unit shown in FIG. 1.

FIG. 6 is a flowchart showing white-balance gain calculation (control) processing procedures executed by the white-balance gain control unit 109 shown in FIG. 1.

According to FIG. 6, it is determined whether the value of the white-color amount is greater than or equal to a first predetermined threshold value at step S601. Namely, it is determined whether the image includes a white area large enough to control the white balance.

Implementation of step S601 functions as the first determining unit configured to determine whether the value of the white-extraction area of the photographing information is greater than or equal to the first predetermined threshold value.

When the value of the white-color amount is greater than or equal to the first predetermined threshold value, the processing advances to step S603. Otherwise, the processing advances to step S602.

If the image includes few white-color signals, it is determined whether the white-balance control can be attained based on chromatic-color signals. Namely, it is determined whether the value of the amount of a predetermined chromatic color (any one of the flesh color, the blue color, and the green color in the above-described embodiment) that is included in the image and that is selected by the chromatic-color-extraction control unit 111 is greater than or equal to a second predetermined threshold value.

Implementation of step S602 functions as the second determining unit configured to determine whether the value of the area of the predetermined chromatic color selected by the chromatic-color selection unit is greater than or equal to the second predetermined threshold value when the first determining unit determines that the value of the white-extraction area is smaller than the first predetermined threshold value.

When the value of the amount of the predetermined chromatic color included in the image is greater than or equal to the second predetermined threshold value, the processing advances to step S604. When the value of the amount of the predetermined chromatic color is smaller than the second predetermined threshold value, the processing advances to step S606. The first and second predetermined thresholds values can be the same, although they are not required to be the same.

At step S603, the white balance gain is calculated based on the extracted-white-color average and information about the calculated white balance gain is transmitted to the white-balance amplification unit 104. Since the processing of step S603 is the same as the control clarified in "Description of the Related Art" with reference to FIG. 13, redundant description thereof is omitted.

Implementation of step S603 functions as the first white-balance control unit configured to control the white balance by bringing the color of the white-extraction area near to an achromatic color when the first determining unit determines that the value of the white-extraction area is greater than or equal to the first predetermined threshold value.

At step S604, data of the target color value corresponding to the predetermined chromatic color is acquired. For example, when the chromatic-color-extraction control unit 111 determines to extract data of the color of the blue sky, the target color value of the blue color is acquired.

Figure 7:
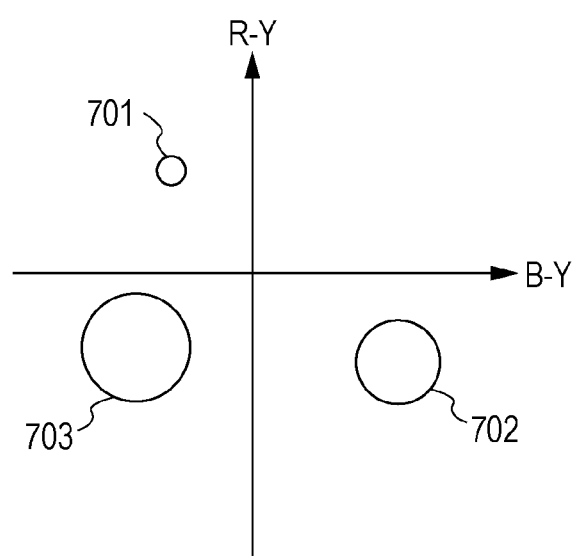
FIG. 7 shows target chromatic-color values determined by the image-pickup apparatus shown in FIG. 1.

FIG. 7 shows exemplary target color values. FIG. 7 shows the target flesh-color value 701 corresponding to a person, the target blue-color value 702 corresponding to the blue color of the sky, and the target green-color value 703 corresponding to the green color of the trees and plants. Since the distributions of the blue color of the sky and the green color of the trees and plants are wider than that of the flesh color of the person, the range of each of the target blue-color value 702 and the target green-color value 703 is larger than that of the target flesh-color value 701.

At step S605, the white balance gain is calculated based on the extracted-chromatic-color average. More specifically, a white balance gain which makes the average of the values of the extracted chromatic color fall within the range of the target color value acquired at step S604 is calculated. At that time, the white balance may not be controlled so that the extracted-chromatic-color average coincides with the center of each of the ranges of the target color values. Namely, the white-balance control is stopped when the average falls within the range of the target color value.

Implementation of step S605 functions as the second white-balance control unit configured to control the white balance by bringing the value of the area of a predetermined chromatic color near to a predetermined target-color value when the second determining unit determines that the value of the predetermined chromatic-color area is greater than or equal to the second predetermined threshold value.

At step S606, another white balance gain is not calculated, but the hitherto used white balance gain is used, as it is. The above-described processing is performed when the image includes a small white area and a small chromatic-color area, the chromatic-color area corresponding to a subject. After steps S603, S605, and S606 are performed, the processing procedures shown in the flowchart of FIG. 6 are finished.

Information about the white balance gain calculated based on the above-described flowchart is transmitted to the white-balance amplification unit 104. The white-balance-amplification unit 104 amplifies color signals by using another white balance gain set for photographed images of the next frame or later.

As described above, the image-pickup apparatus of the above-described embodiment includes the subject identification unit (the subject identification unit 110) and the chromatic-color selection unit (the chromatic-color-extraction control unit 111) configured to select a predetermined chromatic color used for any color other than the white color based on the result of identification performed by the subject identification unit.

The above-described configuration allows for adjusting the white balance even though the photographed image of the subject includes a small white area by extracting data of a color suitable for the subject and bringing the value of the extracted color data near to a target value.

According to the above-described embodiment, the chromatic-color data is extracted after the chromatic color for extraction is determined. However, the time when the chromatic color for use is determined may be after the extraction of the chromatic-color data. For example, after extracting data of all of the colors corresponding to ranges from which data of colors including the flesh color, the blue color, and so forth is extracted, which chromatic color should be used to control the white balance may be determined based on the subject-identification information.

Further, according to the above-described embodiment, the control is performed based on the chromatic color when the subject image includes a small area having a color close to the white color. However, it becomes possible to perform control by using the closer to the target value of the white-extraction average and the chromatic-color-extraction average. For example, if the value of the flesh-color-extraction result is close to the target flesh-color value, the white balance gain is calculated based on the flesh-color-extraction result, even though the subject image includes a sufficiently large white area.

Further, according to the above-described embodiment, the flesh color of the person, the blue color of the blue sky, and the green color of the trees and plants have been described as the predetermined chromatic colors. However, the type of the predetermined chromatic color is not limited only to those of the above-described colors. For example, the red color of a sunset may be used as the chromatic color. In that case, the subject identification unit 110 determines whether the subject image includes the sunset image.

Further, when two or more subject images are detected at the same time, the chromatic colors are selected in order of decreasing precedence, that is, in the order of the flesh color of the person, the blue color of the blue sky, and the green color of the trees and plants according to the processing flow shown in FIG. 3. However, the order in which the chromatic colors are selected is not limited to the above-described precedence order. For example, in a scene where the subject includes a person's face, the main subject is the person as is often the case so that the most important chromatic color becomes the flesh color. However, as for the blue color and the green color other than the flesh color, a priority may be given to either of them. Further, it becomes possible to perform the following control, for example. Namely, a comparison is made between the occupation of the blue sky area in the image and that of the green-trees-and-plants area in the image, so as to determine the area having the occupation larger than that of the other. After that, the blue color or the green color, which corresponds to the area having the larger occupation, is selected.

Further, in the above-described embodiment, only one target value is permanently determined for the chromatic color. However, without being limited to the above-described embodiment, a plurality of target values may be determined. For example, the target flesh-color values corresponding to individual predetermined persons may be provided. In that case, the subject identification unit 110 identifies the predetermined persons and selects the target flesh-color value that had already been related to each of the persons.

Further, a setting unit may be provided so that the user can set the priority order of a subject by operating a menu, for example. In that case, if a plurality of subjects is detected from the same screen image, the color of a subject with a high priority is extracted as the chromatic color for extraction.

An example where the chromatic color for extraction is selected based on the photographing mode used when the image was photographed will next be described as a second embodiment of the present invention.

Figure 8:
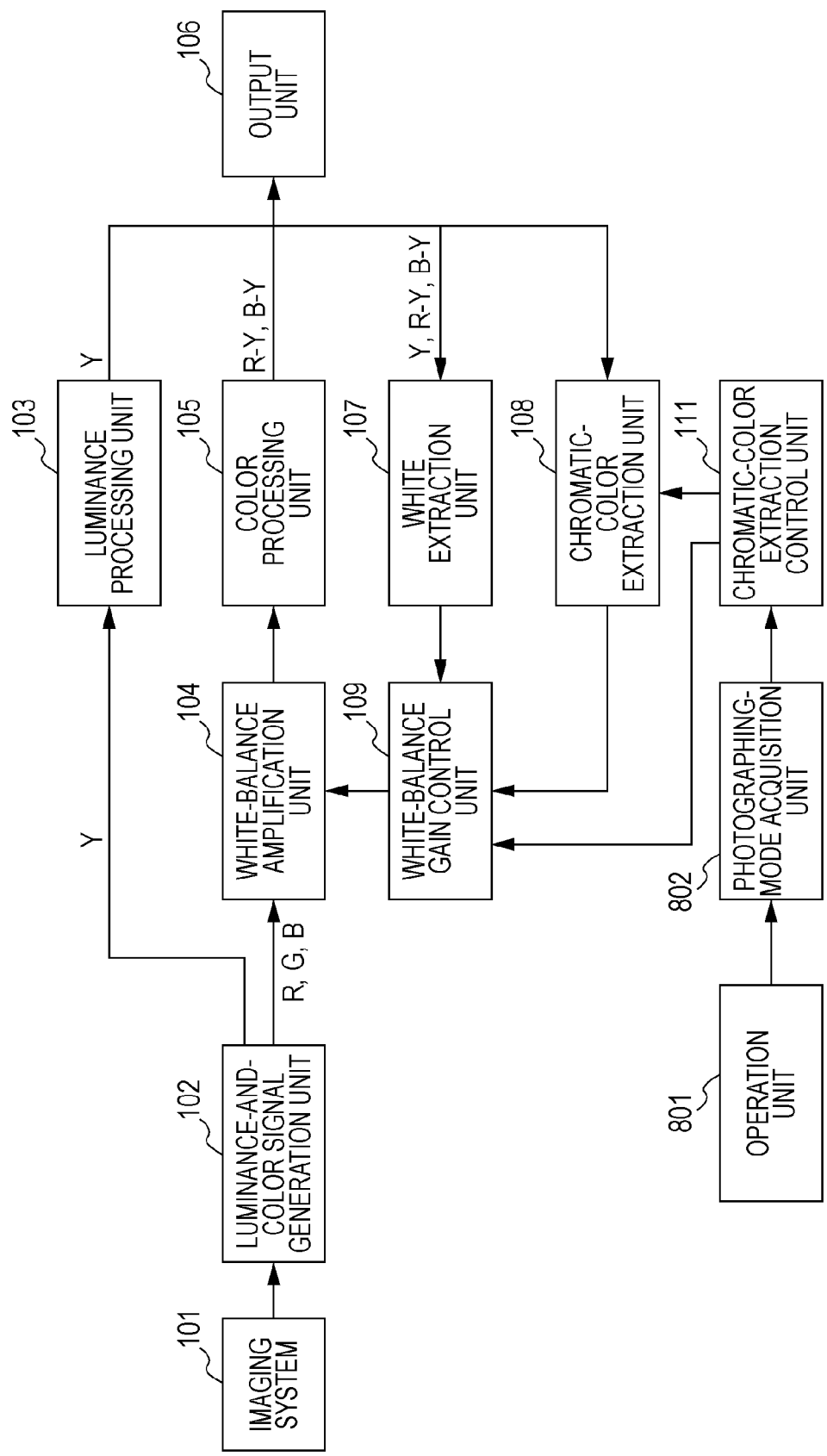
FIG. 8 is a block diagram of an image-pickup apparatus according to a second embodiment of the present invention.

FIG. 8 is a block diagram of an image-pickup apparatus according to the second embodiment.

In FIG. 8, blocks designated by reference numerals 101, 102, 103, 104, 105, 106, 107, 108, 109, and 111 are equivalent to the processing blocks designated by the same reference numerals described with respect to the first embodiment with reference to FIG. 1. In the second embodiment, an operation unit 801 configured to accept data of an operation, the data being transmitted from the user, and a photographing-mode-acquisition unit 802 configured to acquire photographing-mode information are provided in place of the subject identification unit 110 of the first embodiment.

Next, operations of the above-described system will be described.

Since processing procedures performed to extract the signal corresponding to a color close to white through from the imaging system 101 to the white extraction unit 107 are the same as those described in the first embodiment, redundant descriptions thereof are omitted.

The operation unit 801 accepts transmitted data of photographing mode set by the user. Here, the photographing mode including "portrait mode", "fresh green mode", and so forth is provided to specify a subject and/or a scene for photographing and perform image processing based on the characteristics of the subject and/or the scene.

The photographing mode can be switched to different photographing mode based on data of operations performed by the user, the data being transmitted from the user to the operation unit 801. The photographing-mode acquisition unit 802 acquires and transmits the photographing-mode information to the chromatic-color-extraction control unit 111.

The chromatic-color-extraction control unit 111 determines which chromatic color should be extracted based on the photographing mode.

FIG. 9 shows the relationships between the photographing modes and the chromatic colors for extraction. The relationship between the photographing mode and the chromatic color is determined so that data of the color of a subject considered as the main subject in each photographing mode is extracted.

For example, when the "portrait mode" is selected, photographing is performed on the precondition that the main subject is a person. In that case, therefore, the flesh color is selected as the chromatic color for extraction. Similarly, the green color is selected as the chromatic color for extraction when the "fresh green mode" is selected, the red color is selected as the chromatic color for extraction when "autumnal-leave mode" is selected, the blue color is selected as the chromatic color for extraction when "blue-sky mode" is selected, and the red color is selected when "sunset mode" is selected. Information about the chromatic color-for-extraction selected in the above-described manner is transmitted to the chromatic-color extraction unit 108.

Figure 14A:
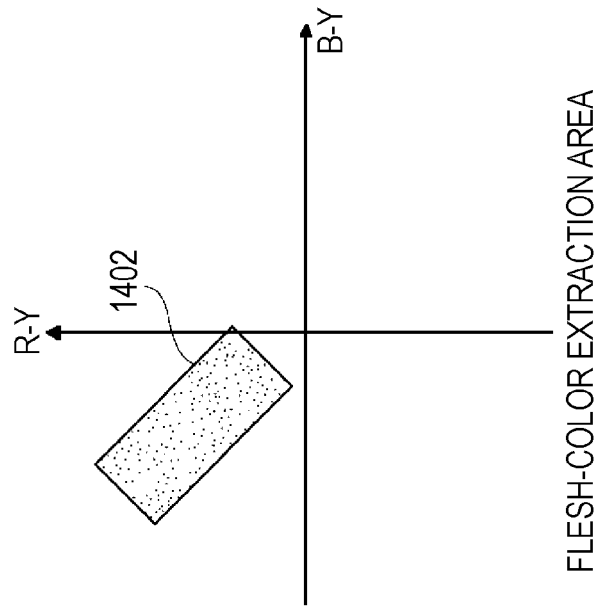
FIG. 14A shows a white-extraction range defined by the conventional image-pickup apparatus shown in FIG. 13.
Figure 14B:
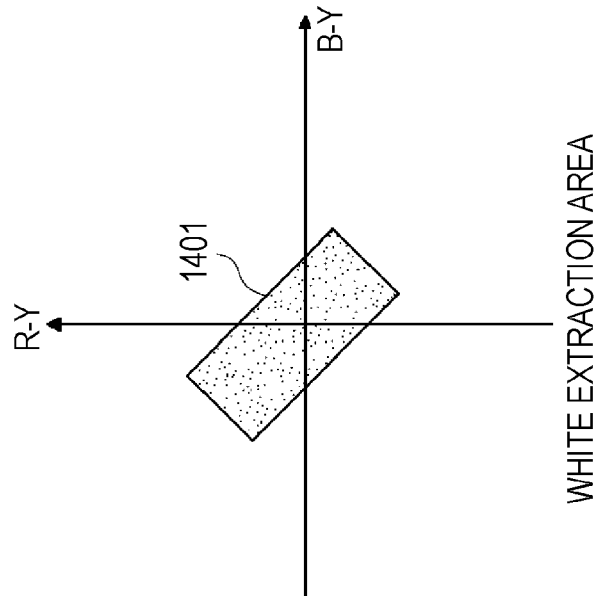
FIG. 14B shows a flesh-color extraction range defined by the conventional image-pickup apparatus shown in FIG. 13.
Figure 15:
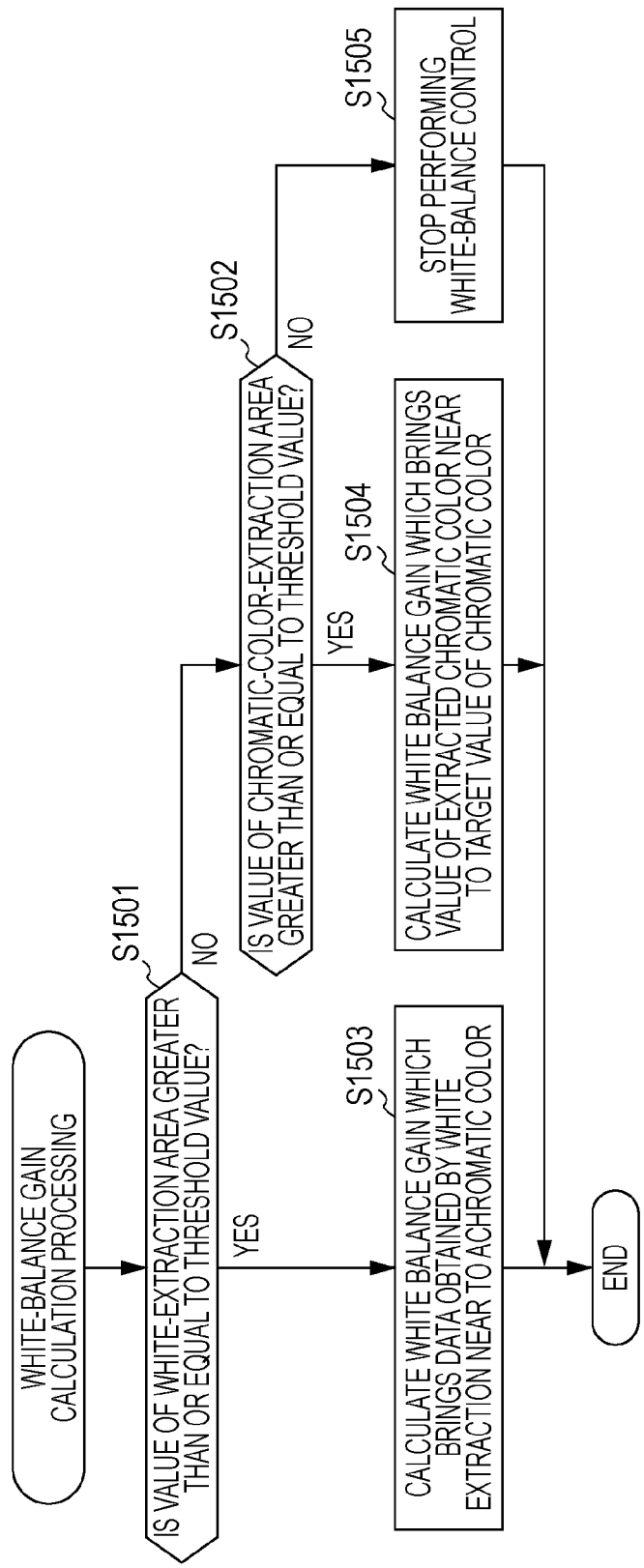
FIG. 15 is a flowchart showing conventional white-balance gain calculation (control) processing procedures executed by a white-balance gain control unit shown in FIG. 13.
Figure 16A:
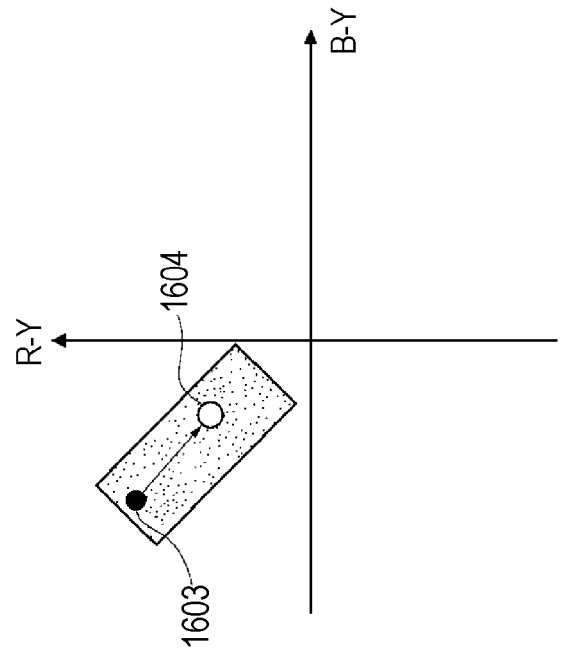
FIG. 16A shows an extracted-white-color average and a target white-color value that are determined by the conventional image-pickup apparatus shown in FIG. 13.
Figure 16B:
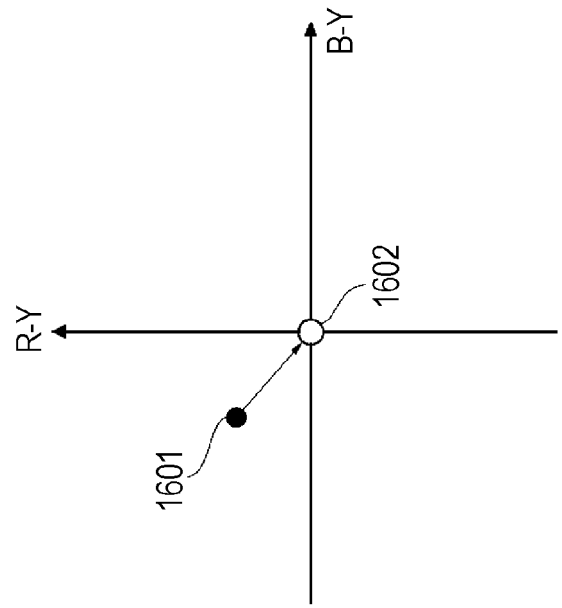
FIG. 16B shows an extracted-chromatic-color average and a target chromatic-color value that are determined by the conventional image-pickup apparatus shown in FIG. 13.

The chromatic-color extraction unit 108 extracts data of a chromatic color based on the chromatic color-for-extraction information. When the flesh color is selected as the chromatic color for extraction, the chromatic-color extraction unit 108 extracts data of color signals included in a flesh-color-extraction range 1402 shown in FIG. 14B from the image, and calculates the extracted-flesh-color average and the flesh-color amount. If a chromatic color other than the flesh color is selected, the chromatic-color extraction unit 108 also extracts data of color signals, calculates the average of the extracted chromatic color and the chromatic-color amount, and transmits information about the calculated average and the calculated amount to the white-balance gain control unit 109.

The white-balance gain control unit 109 controls the white balance gain based on the result of the color-signal extraction performed by each of the white extraction unit 107 and the chromatic-color extraction unit 108. Since the flow of the white-balance-gain calculation is basically the same as that shown in the flowchart of FIG. 6 described in the first embodiment, the redundant detailed description thereof is omitted. However, the white-balance gain control unit 109 obtains a target color value suitable for the photographing mode, so as to obtain the target chromatic-color value at step S604 shown in FIG. 6.

Information about the white balance gain calculated by the white-balance gain control unit 109 is transmitted to the white-balance amplification unit 104. The white-balance amplification unit 104 amplifies the color signal based on another white balance gain set for photographed images of the next frame or later, as is the case with the first embodiment.

As described above, the image-pickup apparatus of the above-described embodiment includes a chromatic-color selection unit (the chromatic-color-extraction control unit 111) configured to select a predetermined chromatic color used for any color other than the white color based on the photographing mode.

The above-described configuration allows for adjusting the white balance by extracting data of the color of the subject in accordance with the photographing mode and bringing the value of the color data near to the target value, even though the photographed image of the subject includes a small white area.

In the present embodiment, data of the color included in the predetermined-chromatic-color-extraction range is extracted from the entire image. However, the subject identification information may be used in addition, as is the case with the first embodiment. For example, if the flesh color is selected as the chromatic color for extraction in the "portrait mode", the control may be performed as below. Namely, data of the person's face is detected, and data of colors included in the flesh-color-extraction range is extracted from the area of the detected face data.

Further, the photographing mode is not limited only to those described above. Any mode can be used so long as the mode is suitable for the subject. For example, the "autumnal-leave mode" may be used as additional mode.

An example where the white balance is controlled by estimating the color temperature of the light source based on the chromatic-color area of the subject image will next be described as a third embodiment of the present invention.

Figure 10:
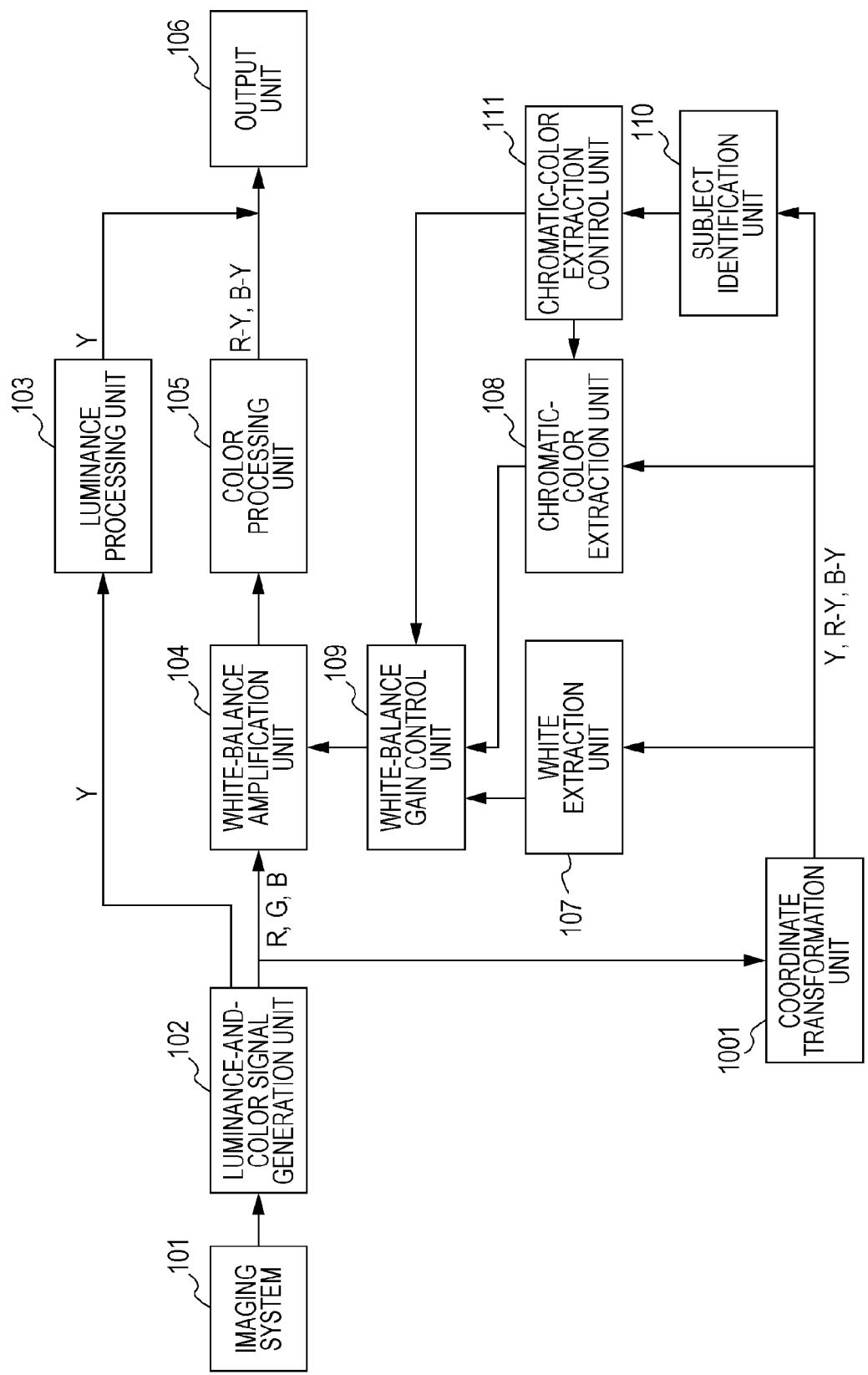
FIG. 10 is a block diagram of an image-pickup apparatus according to a third embodiment of the present invention.

FIG. 10 is a block diagram of an image-pickup apparatus according to the third embodiment.

The configuration of the above-described image-pickup apparatus is the same as that of the image-pickup apparatus of the first embodiment illustrated in FIG. 1 except for the addition of a coordinate-transformation unit 1001.

Next, operations of the above-described system will be described.

Since the processing procedures that are started by the imaging system 101 configured to pickup an image and that are finished by the output unit 106 configured to externally transmit data of the image are the same as those performed in the first embodiment, redundant description thereof is omitted.

A color signal transmitted from the luminance-and-color-signal generation unit 102 is transmitted to the coordinate-transformation unit 1001. The coordinate-transformation unit 1001 converts R, G, and B color signals into a luminance signal (Y) and color-difference signals (R-Y and B-Y).

The converted signals are transmitted to the individual white extraction unit 107, chromatic-color extraction unit 108, and subject identification unit 110. The subject identification unit 110 identifies the subject and the chromatic-color extraction unit 108 selects a chromatic color for extraction as is the case with the first embodiment.

Further, since the processing procedures performed by the white extraction unit 107 and the chromatic-color extraction unit 108 are the same as those performed in the first embodiment, redundant description thereof is omitted.

The present embodiment is different from the first embodiment in that the color temperature of the light source is estimated based on the result of the color extraction. The color temperature is estimated through the white-balance gain control unit 109.

Figure 11:
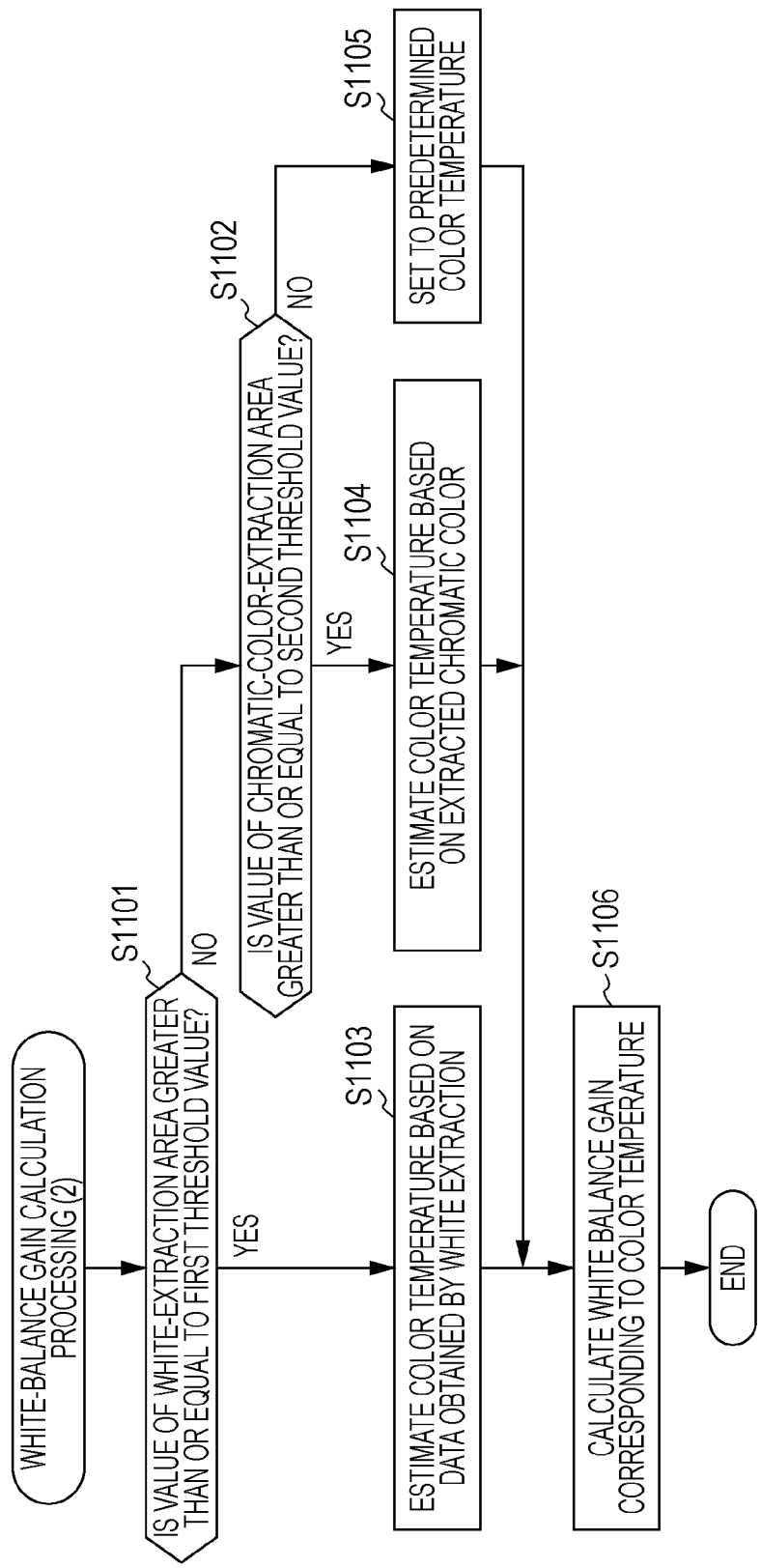
FIG. 11 is a flowchart showing white-balance gain calculation (control) processing procedures executed by a white-balance gain control unit shown in FIG. 10.

FIG. 11 is a flowchart showing processing procedures performed by the white-balance gain control unit shown in FIG. 10 to calculate (control) the white balance gain.

In FIG. 11, it is determined whether the value of the white-color amount extracted by the white-extraction unit 107 is greater than or equal to a first predetermined threshold value at step S1101. For example, it is determined whether the image includes a white area large enough to control the white balance. If the value of the white-color amount is greater than or equal to the first predetermined threshold value, the processing advances to step S1103. Otherwise, the processing advances to step S1102.

At step S1102, it is determined whether the value of the amount of a predetermined chromatic color (the flesh color, the blue color, the green color, etc.) selected by the chromatic-color-extraction control unit 111 when the image includes a small number of white-color signals is greater than or equal to a second predetermined threshold value, the predetermined chromatic color being included in the image. If the value of the amount of the predetermined chromatic color included in the image is greater than or equal to the second predetermined threshold value, the processing advances to step S1104. Otherwise, the processing advances to step S1105. The first and second predetermined thresholds values can be the same, although they are not required to be the same.

At step S1103, the color temperature of the light source is estimated based on the extracted-white-color average. Implementation of step S1103 functions as the first estimation unit configured to estimate the first color temperature based on color signals extracted by a white extraction unit (the white extraction unit 107).

Figure 12:
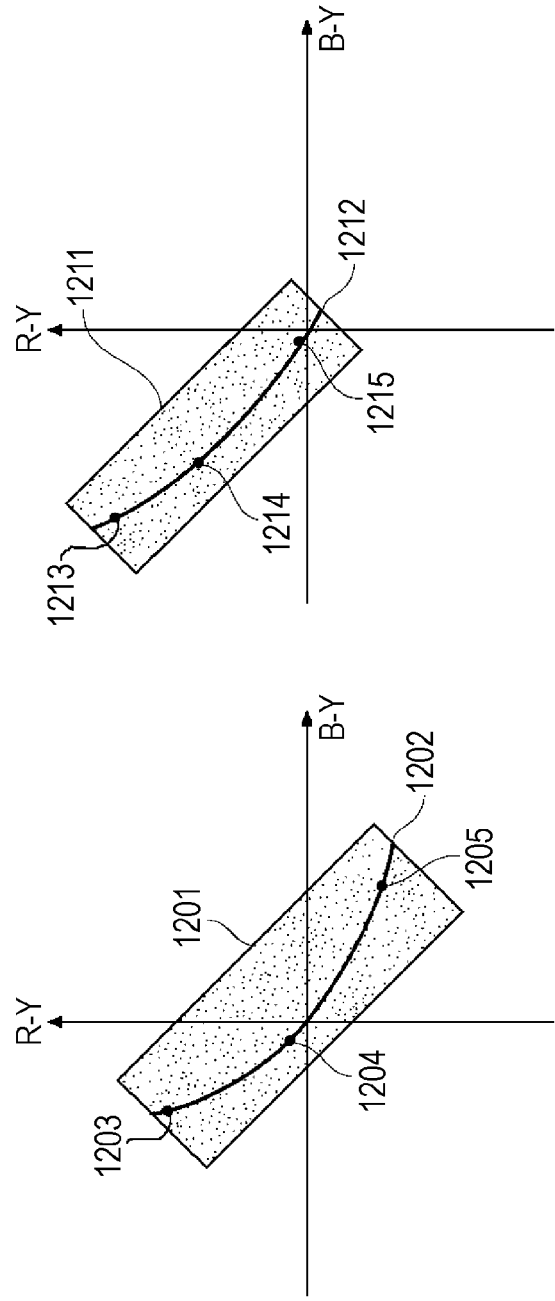
FIG. 12A shows the relationship between an extracted-white-color average and a color temperature that are specified by the image-pickup apparatus shown in FIG. 10.
FIG. 12B shows the relationship between an extracted-flesh-color average and another color temperature that are specified by the image-pickup apparatus shown in FIG. 10.

FIG. 12A shows the relationship between the extracted-white-color average and the color temperature on the color-difference plane. In FIG. 12A, a white-extraction range 1201 and a black-body-radiation axis 1202 are shown. Namely, the white-color data moves on the black-body-radiation axis 1202 in accordance with the variation of the color temperature. Each of reference numerals 1203, 1204, and 1205 indicates the position of the white-color data, the position varying from one color temperature to another.

The relationship between the color temperature and the white color is determined in advance by plotting color temperatures obtained when a piece of white paper or the like is photographed for each color temperature. When the extracted-white-color average is at the position 1203, it can be estimated that the color temperature of the light source is at 2000 K based on the relationship between the color temperature and the white-color data. Similarly, when the extracted-white-color average is at the position 1204, it can be estimated that the color temperature of the light source is at 4000 K. Further, when the extracted-white-color average is at the position 1205, it can be estimated that the color temperature of the light source is at 6000 K.

At step S1104, the color temperature of the light source is estimated based on the extracted-chromatic-color average. Implementation of step S1104 functions as the second estimation unit configured to estimate the second color temperature based on the signals of the chromatic color, which are extracted by a chromatic-color extraction unit (the chromatic-color extraction unit 108).

Here, an example where the chromatic-color-extraction control unit 111 selects the flesh color as the chromatic color will be described.

FIG. 12B shows the relationship between the extracted-flesh-color average and the color temperature on the color-difference plane. In FIG. 12B, a flesh-color-extraction range 1211 and a flesh-color-change axis 1212, where the flesh color changes in accordance with a change in the color temperature of the light source. Each of reference numerals 1213, 1214, and 1215 indicates the position of the flesh-color data, the position varying from one color temperature to another.

The relationship between the color temperature and the flesh color is determined in advance by plotting color temperatures obtained when the flesh color of a person is photographed. When the extracted-flesh-color average is at the position 1213, for example, it can be estimated that the color temperature of the light source is at 2000 K based on the relationship shown in FIG. 12B. Similarly, when the extracted-flesh-color average is at the position 1214, it can be estimated that the color temperature of the light source is at 4000 K. Further, when the extracted-flesh-color average is at the position 1215, it can be estimated that the color temperature of the light source is at 6000 K.

Further, when the blue color of the blue sky and/or the green color of the trees and plants other than the flesh color is selected, determining the relationship between the color temperature and the color in advance allows for estimating the color temperature.

Step S1105 is processing performed when the white-color area and/or the chromatic-color area used to calculate the color temperature is small in size. In that case, it can be estimated that the color temperature is equivalent to a predetermined color temperature (e.g., the color temperature of the daytime sunlight).

At step S1106, the white balance gain corresponding to the estimated color temperature is calculated. Implementation of step S1106 functions as a calculation unit configured to calculate the parameter of the white balance based on the first and second estimated color temperatures.

Here, the parameter of the white balance denotes the gain of the white balance, which amplifies a plurality of color signals included in an image signal for each channel. At that time, the value of the white balance gain corresponding to each of the estimated color temperatures is obtained in advance. Then, the above-described processing procedures are finished.

Information about the white balance gain calculated based on the above-described flow is transmitted to the white-balance amplification unit 104. The white-balance amplification unit 104 amplifies a color signal based on the set white balance gain.

As described above, the image-pickup apparatus according to the present embodiment includes a chromatic-color selection unit (the chromatic-color-extraction control unit 111) configured to select the predetermined chromatic color for use other than the white color based on the result of the identification performed by the subject identification unit, so as to estimate the light source based on the selected chromatic color.

The configuration of the present embodiment allows for extracting data of a color suitable for a subject and estimating the color temperature of the light source even though the photographed image of the subject includes a small white area.

According to the present embodiment, either of the color temperature estimated based on the extracted-white-color average and that estimated based on the extracted-chromatic-color average is used. However, performing control so that the final color temperature is calculated by combining the results of the two color-temperature estimations with each other constitutes another embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
an identification unit configured to identify subjects in images;
a setting unit configured to set a priority value of the subjects identified by the identification unit;
a first white-balance control unit configured to control the white balance of an image by bringing a white extraction area near to an achromatic color; and
a second white-balance control unit configured to control the white balance of the image by bringing a predetermined chromatic-color area near to a predetermined target color value based on priority of an object set by an identification result of the identification unit and the setting unit, wherein the first white-balance control unit controls white balance in a case where the white extraction area in the image is larger than a threshold value; and the second white-balance control unit controls white balance in a case where the white extraction area in the image is less than the threshold value, and wherein the second white-balance control unit controls the white-balance of the image by bringing the predetermined chromatic-color area of a second priority value subject of which the priority value is lower than a first priority value subject near the predetermined target color, in a case where the predetermined chromatic-color area of the first priority value subject is not included in the image.

2. An image processing method comprising:

an identification step provided to identify subjects in images;

a setting step configured to set a priority value of the subject identified by the identification step;

a first white-balance control step configured to control the white balance of an image by bringing a white extraction area near to an achromatic color; and a second white-balance control step provided to control the white balance of the image by bringing a predetermined chromatic-color area near to a predetermined target color value based on priority of an object set by an identification result of the identification step and the setting step, wherein controlling white balance in the first white-balance control step in a case where the white extraction area in the image is larger than a threshold value; and controlling white balance in the second white-balance control step in a case where the white extraction area in the image is less than the threshold value, wherein the second white-balance control step controls the white-balance of the image by bringing the predetermined chromatic-color area of a second priority value subject of which the priority value is lower than a first priority value subject near the predetermined target color, in a case where the predetermined chromatic-color area of the first priority value subject is not included in the image, and wherein at least one of the setting step, first white-balance control step, and second white-balance control step are performed by a processing unit.

3. The image processing apparatus according to claim 1, wherein the greater the percentage of the image of a subject covers, the setting unit sets the priority value high.

4. The image processing apparatus according to claim 1, wherein the setting unit sets the priority value of a subject according to a user's operation.

5. The image processing apparatus according to claim 1, wherein the setting unit sets the priority value of a human higher compared to a subject besides human as a subject.

* * * * *